Patented July 7, 1942

2,289,293

UNITED STATES PATENT OFFICE 2,289,293

MANUFACTURE OF AZO DYES

Heinrich Ohlendorf, Leipzig, and Wolfgang Richter, Halle-on-the-Saale, Germany, assignors to General Aniline & Film Corporation, New York, N. Y., a corporation of Delaware No Drawing. Application May 3, 1940, Serial No. 333,234. In Germany May 3, 1939

10 Claims. (Cl. 260—205)

The present invention relates to new azo dyes and to a process for manufacturing the same.

New azo dyes free from sulfonic acid and carboxylic acid groups which are suitable for dyeing cellulose esters and ethers, especially acetate silk, are obtainable by coupling a diazo compound of the benzene series substituted by one or more nitro groups and, if desired, by halogen, alkyl or hydroxyalkyl groups, with a 3-arylamino-1-butanol having the general formula

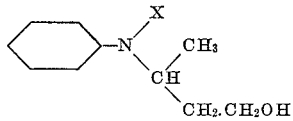

wherein X may stand for hydrogen, an alkyl- or hydroxyalkyl group, and the benzene nucleus may not be substituted in the 4-position.

The coupling components are obtained by condensing 3-halogenbutanol with primary or secondary amines of the benzene series in a manner analogous to the manufacture of hydroxyethylated bases by means of halogenhydrins.

The new dyes have a very good affinity for acetate silk and the generally vivid tints obtained have an especially good fastness to light which is superior to that of the known dyes having an analogous constitution, but containing instead of the branched hydroxybutan radical mentioned above, the hydroxyethyl group at the nitrogen atom. Obviously, this dye effect is due to the presence of the branched aliphatic radical bound to the nitrogen atom.

*Example 1.*—A diazo solution is prepared by introducing at 25° to 30° C., while stirring, 20.7 parts of 2.6 - dichloro-1-amino-4-nitrobenzene into nitrosylsulfuric acid prepared by mixing 7 parts of sodium nitrite with 130 parts of concentrated sulfuric acid, and then diluting the mass by pouring it into a large quantity of ice. The filtered sulfuric acid diazo solution is run, while stirring, into a cold solution of 20 parts of 3-(3'-chloro-phenylamino-)butanol- (1) (obtained by condensing 3-chlorobutanol with m-chloraniline (boiling point at 178° C. to 180° C. under a pressure of 12 mm.)) in 12 parts of hydrochloric acid of 23° Bé. and 800 parts of water. In order to complete the coupling, the solution is neutralized with sodium acetate. The dye is filtered with suction, washed again and dried. It dyes acetate silk orange-brown tints of a very good fastness to light.

When using as coupling component 17.3 parts of 3 - (N-methyl-phenylamino-)butanol - (1) (prepared by condensing 3-chlorobutanol with methylaniline (boiling point at 127° C. to 130° C. under a pressure of 3 mm.)) a dye is obtained which dyes acetate silk also orange-brown tints. The dyeings obtained have a better fastness to light than those obtained by means of the corresponding dye which contains hydroxyethylmethylaniline as coupling component.

*Example 2.*—A diazo solution prepared in the usual manner from 13.8 parts of 4-nitro-1-aminobenzene is run, while stirring, into an ice-cooled solution from 19.3 parts of 3-(N-ethyl-phenylamino-)butanol-(1) (prepared by condensing 3-chlorobutanol with ethylaniline, boiling point at 140° C. to 145° C. under a pressure of 3 mm.), in 12 parts of hydrochloric acid of 23° Bé. and 800 parts of water. In order to complete the coupling reaction, the solution is neutralized with sodium acetate. The dye obtained dyes acetate silk fast red tints.

*Example 3.*—A diazo compound prepared in the usual manner from 17.3 parts of 4-nitro-2-chloro-1-aminobenzene is run, while stirring, into an ice-cooled, feebly hydrochloric acid solution of 17.9 parts of 3-(N-methylphenylamino-)butanol-(1) (prepared by condensing 3-chlorobutanol with monomethylaniline, boiling point at 127° C. to 130° C. under a pressure of 3 mm.). In order to complete the coupling reaction, a sodium hydroxide solution is dropped in, until the mineral acid is just neutralized. The dye obtained dyes acetate silk full ruby tints.

*Example 4.*—A diazo solution which has been prepared by introducing, while stirring, 18.3 parts of 2.4-dinitro-1-aminobenzene into nitrosylsulfuric acid (obtained by mixing 6.9 parts of sodium nitrite with 120 parts of sulfuric acid) and then diluting the mass by pouring it into ice, is run into a cold, feebly hydrochloric acid solution from 22.3 parts of 3-(N-hydroxyethyl-3'-methylphenylamino-)butanol-(1) (prepared by condensing 3-chlorobutanol with m-toluidine (secondary base: boiling point at 120° C. to 123° C. under a pressure of 1 mm.) and subsequently hydroxyethylating the compound (tertiary base: boiling point at 211° C. to 212° C. under a pressure of 11 mm.)). When applied to acetate silk, the finished dye yields red-violet tints.

*Example 5.*—26.2 parts of 6-bromo-2.4-dinitro-1-aminobenzene are introduced at 50° C. to 60° C., while stirring, into nitrosylsulfuric acid prepared by mixing 6.9 parts of sodium nitrite with 120 parts of concentrated sulfuric acid. The mass is kept at this temperature for several hours. The thickly liquid solution obtained is then cooled to 10° C. to 15° C. and slowly run, while stirring, into an ice-cooled solution from 25.3 parts of 3-(N-hydroxyethyl-5'-methyl-2'-methoxy-phenylamino-)butanol-(1) (obtained by condensing 3-chlorobutanol with 1-amino-2-methoxy-5-methyl-benzene (boiling point at 189° C. to 190° C. under a pressure of 14 mm.) and subsequently hydroxyethylating the compound obtained (boiling point at 190° C. to 193° under a pressure of 4 mm.). The dye obtained dyes acetate silk reddish blue tints.

| Diazo compound from— | Coupled with— | Dyeing on acetate silk |
|---|---|---|
| 2.4-dinitro-1-aminobenzene. | 3-phenylamino-butanol-(1). | Blue red. |
| 4-nitro-2-chloro-1-aminobenzene. | 3-(3'-methyl-phenyl-amino-)butanol-(1). | Do. |
| 4-nitro-1-aminobenzene. | 3-(N-methyl-phenyl-amino-)butanol-(1). | Scarlet. |
| 2.4-dinitro-1-aminobenzene. | 3-(N-ethyl-phenyl-amino-)butanol-(1). | Red-violet. |
| 4-nitro-1-aminobenzene. | 3'-(N-ethyl-3'-methyl-phenylamino-)butanol-(1). | Red. |
| 6-bromo-2.4-dinitro-1-aminobenzene. | 3-(N-ethyl-3'-methyl-phenylamino-)butanol-(1). | Bluish violet. |
| 4-nitro-1-aminobenzene. | 3-(N-n-butyl-3'-chloro-phenylamino-)butanol-(1). | Scarlet. |
| Do. | 3-(N-n-butyl-3'-methyl-phenylamino-butanol-(1). | Bluish red. |
| 4-nitro-2-chloro-1-aminobenzene. | 3-(N-n-butyl-3'-methyl-phenylamino-)butanol-(1). | Reddish violet. |

What we claim is:

1. The azo dyes which correspond to the general formula

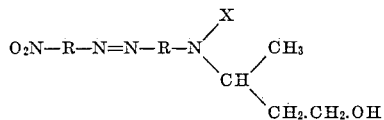

wherein R means a radical of the benzene series which is free from sulfonic and carboxylic acid groups and X is a member of the group consisting of hydrogen, alkyl and hydroxyalkyl said dyes having a very good affinity for acetate silk and the tints obtained therewith having an especially good fastness to light.

2. The azo dyes which correspond to the general formula

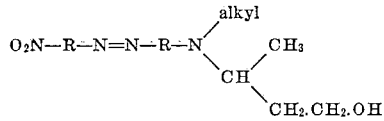

wherein R means a radical of the benzene series which is free from sulfonic and carboxylic acid groups, said dyes having a very good affinity for acetate silk and the tints obtained therewith having an especially good fastness to light.

3. The azo dyes which correspond to the general formula

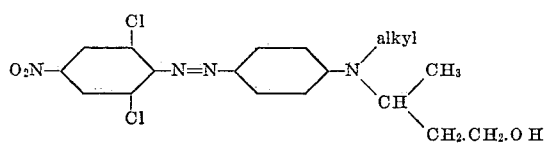

said dyes having a very good affinity for acetate silk and the tints obtained therewith having an especially good fastness to light.

4. The azo dyes which correspond to the formula

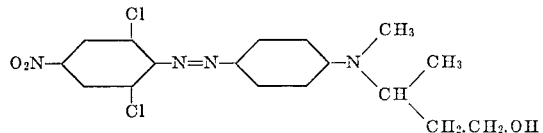

said dyes having a very good affinity for acetate silk and the tints obtained therewith having an especially good fasteness to light.

5. The azo dye which corresponds to the formula

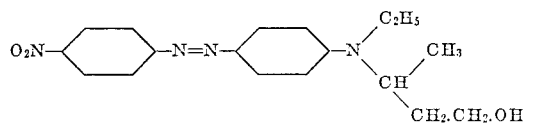

said dye having a very good affinity for acetate silk and the tints obtained therewith having an especially good fastness to light.

6. The process which comprises coupling a diazo compound of the benzene series containing a nitro group but being free from sulfonic and carboxylic acid groups with an amine of the general formula

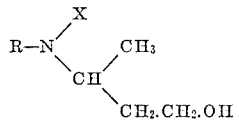

wherein R is a radical of the benzene series free from sulfonic and carboxylic acid groups and X is a member of the group consisting of hydrogen, alkyl and hydroxyalkyl.

7. The process which comprises coupling a diazo compound of the benzene series containing a nitro group but being free from sulfonic and carboxylic acid groups with an amine of the general formula

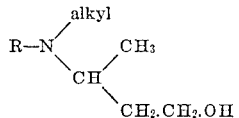

wherein R is a radical of the benzene series free from sulfonic and carboxylic acid groups.

8. The process which comprises diazotizing a para-nitraniline and coupling the diazo compound with 3-(N-methyl-phenylamino-)butanol 1.

9. The process which comprises diazotizing 2.6-dichloro-1-amino-4-nitrobenzene and coupling the diazo compound with 3-(N-methyl-phenylamino-)butanol 1.

10. The process which comprises diazotizing 4-nitro-1-aminobenzene and coupling the diazo compound with 3-(N-ethyl-phenylamino-)butanol 1.

HEINRICH OHLENDORF.
WOLFGANG RICHTER.